United States Patent Office
3,493,426
Patented Feb. 3, 1970

3,493,426
PROCESS OF TREATING LEATHER AND FIBROUS MATERIAL WITH POLYISOCYANATE DERIVATIVES
Marwan R. Kamal, Minneapolis, Minn., assignor to General Mills, Inc., a corporation of Delaware
No Drawing. Filed Jan. 3, 1967, Ser. No. 606,584
Int. Cl. B44d *1/32;* D06m *3/00*
U.S. Cl. 117—142                                5 Claims

ABSTRACT OF THE DISCLOSURE

Compounds of the formula

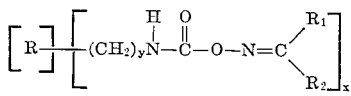

prepared by reacting oximes of 1 to 11 carbon atoms and polymeric fat acid polyisocyanates, aqueous emulsions of such compounds and a process of treating leather and fibrous materials with such compounds.

---

The present invention relates to novel derivatives of certain polyisocyanates and to the use of such derivatives in the treating of leather and fibrous materials. More particularly, it relates to novel derivatives of polyisocyanates prepared from polymeric fat acids and certain oximes and to the process of treating leather and fibrous materials with said derivatives.

It has recently been discovered that polyisocyanates prepared from polymeric fat acids can be used to treat leather and fibrous materials to give same unexpectedly improved physical properies. Such treatment improves the softness and water repellency of the leather and fibrous materials. Additionally, tear resistance and wrinkle resistance is improved in many instances.

The noted polyisocyanates have been applied to the leather and fibrous materials using organic solvents or aqueous emulsions. Neither of these procedures is completely free of difficulties. Thus, the solvent selected must be inert to isocyanate groups and must be removed at the completion of the contacting or impregnating of the leather or fibrous material. Flammability and other hazards characteristic of many organic solvents are also encountered. Aqueous emulsions of the said polyisocyanates were found to be quite useful. The polymeric fat acid polyisocyanates are only very slowly reactive toward water and, accordingly, there is no great loss of isocyanate groups in the limited period of time that the aqueous emulsion is formed and applied. But there is a loss of isocyanate groups and the emulsion can, therefore, be prepared only a reasonably short period of time prior to use.

It is an object of my invention to provide novel derivatives of certain oximes and polyisocyanates prepared from polymeric fat acids. Another object of the invention is to provide novel aqueous emulsions of such derivatives which are stable for relatively long periods of time at ambient temperatures. A further object of the invention is to provide a novel process of treating leather and fibrous materials with such derivatives. These and other objects will become apparent from the folowing detailed description.

I have now discovered that oximes having from 1 to about 11 carbon atoms can be reacted with the polymeric fat acid polyisocyanates to produce new compounds having outstanding properties. These new compounds can be used in the preparation of aqueous emulsions which can be stored for long periods of time at ambient temperatures. The emulsions can be used to treat leather and fibrous materials to obtain the unexpectedly fine properties obtained with the polymeric fat acid polyisocyanates per se.

The polyisocyanates employed in the preparation of the derivatives of the present invention have the following idealized, structural formula:

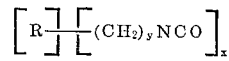

where $y$ is 0 or 1, $x$ is an integer of 2 to about 4 and R is the hydrocarbon group of polymeric fat acids.

The polyisocyanates wherein $y$ is 0 are prepared by converting the polymeric fat acids to the corresponding polymeric acid chlorides, reacting the acid chlorides with a metal azide to form the polymeric acyl azides and then heating the acyl azides to produce the polyisocyanates. This method of preparation can be conveniently illustrated by the following equations (using a dimeric fat acid as an example):

$$3R(COOH)_2 + 2PCl_3 \rightarrow 3R(COCl)_2 + 2H_3PO_3$$
$$R(COCl)_2 + 2NaN_3 \rightarrow R(CON_3)_2 + 2NaCl$$
$$R(CON_3)_2 \xrightarrow{\Delta} R(NCO)_2 + 2N_2$$

The polyisocyanates wherein $y$ is 1 are prepared by converting the polymeric fat acids to the corresponding polynitriles and then hydrogenating the polynitriles in the presence of ammonia and a catalyst such as Ramey nickel to form polyamines. The polyamines are then reacted with phosgene to give the polyisocyanates. This method of preparation can be conveniently illustrated by the following equations (using a dimeric fat acid as an example):

$$R(COOH)_2 + 2NH_3 \rightarrow R(CN)_2 + 4H_2O$$

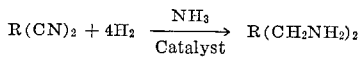

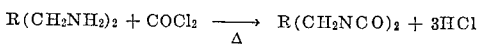

The polymeric fat acids, useful as the starting materials for preparing the polyisocyanates, are prepared by polymerizing a fat acid. The term "fat acid" as used herein refers to naturally occurring and synthetic monobasic aliphatic acids having hydrocarbon chains of 8–24 carbon atoms. The term "fat acids," therefore, includes saturated, ethylenically unsaturated and acetylenically unsaturated acids. "Polymeric fat radical" is generic to the divalent, trivalent and polyvalent hydrocarbon radicals of dimerized fat acids, trimerized fat acids and higher polymers of fat acids, respectively. These divalent and trivalent radicals are referred to herein as "dimeric fat radical" and "trimeric fat radical."

The saturated, ethylenically unsaturated, and acetylenically unsaturated fat acids are generally polymerized by somewhat different techniques, but because of the functional similarity of the polymerization products, they all are generally referred to as "polymeric fat acids."

Saturated fat acids are difficult to polymerize, but polymerization can be obtained at elevated temperatures with a peroxidic reagent such as di-t-butyl peroxide. Because of the low yields of polymeric products, these materials are not commercially significant. Suitable saturated fat acids include branched and straight chain acids such as caprylic acid, pelargonic acid, capric acid, lauric acid, myristic acid, palmitic acid, isopalmitic acid, stearic acid, arachidic acid, behenic acid and lignoceric acid.

The ethylenically unsaturated acids are much more readily polymerized. Catalytic or non-catalytic polymerization techniques can be employed. The non-catalytic polymerization generally requires a higher temperature.

Suitable agents for the polymerization include acid or alkaline clays, di-t-butyl peroxide, boron trifluoride and other Lewis acids, anthraquinone, sulfur dioxide and the like. Suitable monomers include the branched and straight chain, poly- and monoethylenically unsaturated acids such as 3-octenoic acid, 11-dodecenoic acid, linderic acid, lauroleic acid, myristoleic acid, tsuzuic acid, palmitoleic acid, petroselinic acid, oleic acid, elaidic acid, vaccenic acid, gadoleic acid, cetoleic acid, nervonic acid, linoleic acid, linolenic acid, eleostearic acid, hiragonic acid, moroctic acid, timnodonic acid, eicosatetraenoic acid, nisinic acid, scoliodonic acid and chaulmoogric acid.

Acetylenically unsaturated fat acids, such as isanic and isanolic acids, can also be polymerized to give polymeric acids which can be used. The acetylenically unsaturated acids occur only rarely in nature and are expensive to synthesize. Therefore, they are not currently of commercial significance.

Although any one of the above-described saturated, ethylenically unsaturated and acetylenically unsaturated fat acids may be used to prepare the polymeric fat acids, it is generally the practice in the art to polymerize mixtures of acids (or the simple aliphatic alcohol esters—i.e., the methyl esters) derived from the naturally occurring drying and semi-drying oils. Suitable drying and semi-drying oils include soybean, linseed, tall, tung, perilla, oiticia, cottonseed, corn, sunflower, dehydrated castor oil and the like. Also, the most readily available acids are oleic and linoleic and thus they are preferred starting materials for the preparation of the polymeric fat acids. It is preferred to employ as starting materials in the preparation of the polyisocyanates, relatively pure dimerized fat acids. Such acids can be obtained from mixtures containing monomer, the dimerized fat acids, trimerized fat acids and higher polymers by high vacuum distillation or solvent extraction. The use of relatively pure dimerized fat acids as a starting material is advantageous where a diisocyanate of high purity is desired. Of course, mixtures of the polymerized fat acids can also be used to prepare mixtures of polyisocyanates. Any of the described unsaturated polymeric fat acids can be hydrogenated prior to the use thereof in the polyisocyanate preparation.

The following examples illustrate the preparation of the polyisocyanates useful in the present invention.

EXAMPLE A

In a 1 liter, round bottom flask equipped with a reflux condenser protected by a calcium chloride drying tube were placed 200 g. of purified dimerized fat acid dissolved in 200 ml. of Skellysolve B and 65 g. of phosphorus trichloride. The dimerized fat acid was derived from the mixture of acids in tall oil and consisted mainly of dimerized linoleic and oleic acids. It had the following properties: wt. percent dimerized fat acid—99; wt. percent monomer—0.5; neut. equiv.—286; and sap. equiv.—280. The reaction mixture was heated under reflux for 2 hours and then allowed to stand overnight. The clear solution of the dimerized fat acid chloride was decanted from the heavy phosphorus acid. The solvent and excess phosphorus trichloride were removed under reduced pressure.

Into a 1 liter reaction flask equipped with cooling coils, stirrer and thermocouple was placed a solution of 30.4 g. sodium azide in 125 ml. water cooled to 10° C. To this rapidly stirred solution was added a solution of 100 g. of the dimerized fat acid chloride dissolved in 150 ml. of acetone. The reaction temperature was controlled at 10–15° C. during the addition and during a 1 hour period following addition, after which 200 ml. of heptane was added. The heptane layer was separated, washed with 2 portions of cold water, and then dried over magnesium sulfate. To 200 ml. heptane maintained at 65–70° C. was added the above dried heptane solution of the dimerized fat acyl azide. The solution was maintained at a temperature of 65–70° C. for 1 hour and then the heptane was evaporated at reduced pressure. There was obtained 70 g. liquid diisocyanate having the following formula:

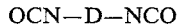

OCN—D—NCO where D is the dimeric fat radical derived from the starting dimerized fat acids.

EXAMPLE B

The preparation as described in Example A was repeated except that the dimerized fat acid chloride (94 g.) was dissolved in 140 ml. of heptane instead of acetone. There was obtained 63 g. of the diisocyanate.

EXAMPLE C

The preparation as described in Example A was repeated except that 213 g. of the dimerized fat acid chloride was dissolved in 300 ml. acetone. There was obtained 177 g. of the diisocyanate.

EXAMPLE D

Two hundred forty grams of phosgene (2.42 mole) were dissolved in 700 ml. of dry toluene with cooling in an ice bath to maintain the solution temperature below 5° C. The phosgene solution was then placed in a 2 liter, 3-neck flask equipped with a Dry Ice condenser, a stirrer and a funnel. A solution of 164.4 g. double distilled dimer amine (0.6 eq.) in 200 ml. toluene was placed in the funnel. The diamine was prepared by hydrogenating a dimer nitrile in the presence of ammonia and methanol-wet Raney nickel catalyst. The dimer nitrile was prepared from a dimerized fat acid derived from the mixture of acids in tall oil which acid consisted mainly of dimerized linoleic and oleic acids. The dimer amine had the following properties: wt. percent monomer—0.5; wt. percent dimer—98.5; wt. percent trimer—1.0; and neut. equiv.—271.

The flask was warmed by using a heating mantle until a heavy reflux of phosgene was observed (40–50° C.). The dimer amine solution was then added slowly over a 1 hour period. After the addition was complete, the reaction mixture was refluxed for an additional 2 hours. The Dry Ice condenser was replaced with a water condenser and the temperature of the solution was raised slowly until the toluene began to reflux. The refluxing was continued for 6 hours after which the heating was discontinued and the solution allowed to cool to room temperature. The toluene was then removed under reduced pressure. There was obtained 181.4 g. of diisocyanate having the formula:

OCN—CH$_2$—D—CH$_2$—NCO where D is the dimeric fat radical derived from the starting dimerized fat acid. The diisocyanate was a light brown, oily liquid.

EXAMPLE E

The procedure of Example D was repeated except that the dimerized fat acid was hydrogenated prior to being converted to the dinitrile and thence to the starting dimer amine. There was obtained 179 g. of saturated diisocyanate which had substantially the same properties as the diisocyanate of Example D but was lighter in color.

The described polyisocyanates are then reacted with oximes to form the derivatives of the present invention having the following idealized, structural formula:

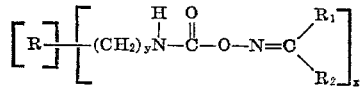

$$\left[ R \right] \left[ -(CH_2)_y N - \overset{H}{\underset{|}{C}} - \overset{O}{\underset{\|}{C}} - O - N = C \diagup_{R_2}^{R_1} \right]_x$$

where R, x and y have the meanings set forth above and $R_1$ and $R_2$ are selected from the group consisting of hydrogen and alkyl groups of 1 to 10 carbon atoms with the proviso that the total number of carbon atoms in said groups does not exceed 10.

The oximes useful in the preparation of the derivatives of the invention have the general formula

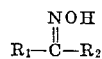

where $R_1$ and $R_2$ are as defined above. Representative alkyl groups are methyl, ethyl, propyl, isopropyl, butyl, isobutyl, pentyl, hexyl, heptyl, octyl, 2-ethyl hexyl, nonyl, decyl and the like. Preferred oximes are those in which the total number of carbon atoms in $R_1$ and $R_2$ is less than about 6. Especially preferred oximes for use in preparing the derivatives are 2-butanone oxime and acetone oxime.

The derivatives are prepared by reacting the polymeric fat acid polyisocyanate with the oxime at temperatures of about 25 to 130° C. It is also preferred to use substantially equivalent amounts of the reactants. An excess of the oxime can be employed and then removed at the completion of the reaction. However, no particular advantage is seen in employing such excess. The reaction is also preferably carried out in the presence of an inert organic solvent such as dioxane, acetone, mineral spirits, benzene or the like. The solvent is removed at the completion of the reaction.

The following specific description illustrates the preparation of the new compounds of the present invention:

Example 1

Into a 500 ml. round bottom flask equipped with a condenser were charged 150 g. dry dioxane (dried over anhydrous sodium sulfate), 150 g. of diisocyanate as prepared in Example E and 46 g. 2-butanone oxime. The reaction mixture was refluxed for four hours (102° C.) and then the dioxane was removed under reduced pressure (10 mm. Hg). There was obtained 190 g. of derivative having the formula

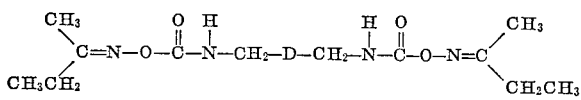

where D is the dimeric fat radical of the starting dimerized fat acid.

Example 2

Example 1 is repeated using acetone oxime (36.5 g.). There is obtained a derivative having the formula

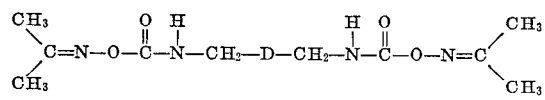

The derivatives can be used to treat leather products in general. This includes the leather from any animal and particularly the readily available leathers such as cowhide, pigskin, goatskin, horsehide and the like. The leather may be ordinary tanned leather or it may have been subjected to additional finishing operations. The derivatives can also be used to treat a wide variety of fibrous materials. These materials are principally cellulosic in nature, although the invention may also be used for the treatment of noncellulosic fibers, such as wool and other animal fibers as well as synthetic cellulosic and noncellulosic fibers, such as viscose rayon, cuprammonium rayon, cellulose acetate, nylon, polyester fibers and the like and mixtures of fibers such as mixtures of cotton and polyester fibers. The invention is applicable to the treatment of woven textile materials from the above sources as well as fibrous sheets, pads, films, mats—i.e., paper, and the like, laid down from such fibers even though in a nonwoven form. It is also applicable to other forms of the fibers as, for example, cellulose sponge.

As indicated above, the derivatives of the present invention are stable at room temperature for long periods of time even in the presence of water. Thus in one preferred embodiment, an aqueous emulsion of the said derivatives is prepared which emulsion also forms part of the invention. This emulsion is stable for long periods of time at room temperatures—i.e., by stable is meant that the derivative does not react or lose any of its reactive isocyanate groups which groups are blocked by the reaction with the oxime. The derivative can be present in the emulsion in widely varying amounts and preferably in amounts of about .05 to 50% by weight. The emulsion also preferably contains an emulsifying agent. The emulsion can be prepared and then stored for long periods of time prior to use. If separation of the derivative and water occurs, re-emulsification can be effected by simple stirring or shaking.

The leather and fibrous material are contacted with the derivative and then the same are heated to temperatures in the range of about 100 to 200° C. The indicated preferred method of carrying out the contacting is to apply the described aqueous emulsion of the derivative to the leather or fibrous material. Thus the leather or fibrous material can be dipped or immersed in the emulsion, the emulsion can be sprayed onto the surface or surfaces of the leather or fibrous material or the like. Of course, the derivative can be dissolved in an inert organic solvent and applied to the leather or fibrous material. But the solvent must then be removed because of the flammability and other problems connected with the use of organic solvents are encountered.

The impregnated leather or fibrous material is then heated as indicated. Such heating causes the derivative to decompose into the starting polyisocyanate and oxime. The nature of the reaction, if any, between the related polyisocyanate and the leather or fibrous material is not known. It is, of course, possible that the isocyanate groups may react with the various functional groups in the leather, such as the amine and amide groups. It is also possible that the isocyanate groups may react with hydroxyl groups or other functional groups in the cellulosic molecule or may react with amine groups or other functional groups in noncellulosic fibrous materials such as wool. Another possibility is that the action which is obtained is physical in nature. A further possibility is that the released polyisocyanates may form homopolymers through reaction between water and the isocyanate groups to form polyureas. Regardless of what the physical or chemical action is which takes place, it has been observed that the polyisocyanates do modify the physical properties of the leather and fibrous materials. This modification may be in any of a number of ways, including softening, water repellency, wrinkle resistance, tear resistance and other related properties.

The leather and fibrous materials can be treated with varying amounts of the derivatives. Relatively small quantities are effective to modify properties somewhat. The degree to which the properties are modified depends to some extent on the concentration of the derivative employed, said derivative releasing corresponding amounts of the starting polyisocyanate on heating. In general, even minute quantities of the derivatives and thus the isocyanates produce some results. In general, for softening purposes, quantities of 0.05% and above of the derivative based on the dry weight of the leather or fibrous material should be used. For water repellency or water proofing, higher levels of 1% on up to 5 and, in some instances, even 10% may be used. Good results are obtainable at relatively low levels for both softening and water repellency. The higher levels may be desirable where especially high degrees of water repellency or water proofness are desired. It is, therefore, an especially preferred embodiment to contact and thus impregnate the leather or fibrous materials with from about 0.05 to 10% by weight of the derivative based on the dry weight of the substrate.

The following examples will serve to further illustrate the invention.

EXAMPLE I

To a household Waring Blendor were added 196 g. water and 0.4 g. emulsifying agent (Triton X-114 available from Rohm and Hass—reaction product of t-octylphenol and ethylene oxide—mole ratio of about 1 to 7-8). Then 4.0 g. of the derivative as prepared in Example I was added and the resulting mixture was blended on high blender speed for one minute. The resulting emulsion was quite physically stable since there was no separation for several hours on storage at room temperature—i.e., 72° F. There is also no loss of isocyanate groups since the derivative is stable at room temperature.

EXAMPLE II

A piece of birdseye cotton (8" x 18") was dipped in the emulsion of Example I, hung up to dry and then placed in an air circulating oven for 40 minutes at 140° C. The cured piece of cotton was then washed using a conventional anionic detergent (Tide) and dried. Water dropped on the treated cloth after washing stayed there for more than two hours without penetrating the cloth. The treated cloth was also much softer to the feel than untreated cloth. The cloth was washed and dried five more times and such washing was found to have very little effect on the fine properties of the treated cloth. These same fine properties were also obtained using a portion of the emulsion stored for one month.

EXAMPLE III

Pieces of Scott #170 paper towels were dipped in the emulsion as prepared in Example I. The impregnated paper was then dried in an oven at 140° C. for 40 minutes. After drying, the treated pieces of paper showed definite water repellency.

EXAMPLE IV

Example III is repeated using top-grain cowhide leather. The dried and cured leather is water repellent and much softer than the untreated leather.

Derivatives of my invention thus have the outstanding ability of forming aqueous emulsions without loss of reactivity—i.e., isocyanate groups. They also decompose on heating at moderate temperatures to yield the starting polyisocyanate. This is highly advantageous because the leather and fibrous material substrates do not have to be heated to deleteriously high temperatures.

It is to be understood that the invention is not to be limited to the exact details of operation or the exact compositions shown and described, as obvious modifications and equivalents will be apparent to those skilled in the art.

The embodiments of the invention in which an exclusive property or privilege is claimed are defined as follows:

1. A process of treating leather and fibrous materials which comprises contacting the same with a compound having the structural formula:

$$\left[R\right]\left[(CH_2)_y\overset{H}{\underset{|}{N}}-\overset{O}{\underset{\|}{C}}-O-N=C\overset{R_1}{\underset{R_2}{\diagdown}}\right]_x$$

where $y$ is 0 or 1, $x$ is an integer of 2 to about 4, R is the hydrocarbon group of polymeric fat acids, said polymeric fat acids having been prepared by the polymerization of monobasic, aliphatic carboxylic acids of 8-24 carbon atoms, and $R_1$ and $R_2$ are selected from the group consisting of hydrogen and alkyl groups of 1 to 10 carbon atoms with the proviso that the total number of carbon atoms in said groups does not exceed 10 and heating the resulting impregnated substrate to temperatures in the range of 100 to 200° C.

2. The process of claim 1 wherein the leather and fibrous materials are contacted with an aqueous emulsion of the compound.

3. The process of claim 1 wherein the compound is used in an amount of about 0.05 to 10% by weight based on the dry weight of the leather and fibrous materials.

4. A process of treating leather and fibrous materials which comprises contacting same with an aqueous emulsion of a compound having the structural formula:

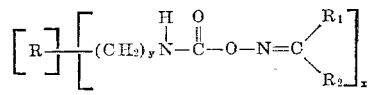

where $x$ is 2, $y$ is 1, $R_1$ is ethyl, $R_2$ is methyl, R is the divalent hydrocarbon group of a dimerized fat acid, said dimerized fat acid having been prepared by the polymerization of a mixture of fat acids consisting mainly of oleic and linoleic acid, and heating the resulting impregnated substrate to temperatures in the range of 100 to 200° C., said compound being present in the emulsion in an amount of about 0.05 to 50% by weight.

5. The process of claim 4 wherein the leather and fibrous materials are impregnated with about 0.05 to 10% by weight of the compound.

References Cited

UNITED STATES PATENTS

| | | | |
|---|---|---|---|
| 2,303,364 | 12/1942 | Schirm | 8—116.2 |
| 3,112,984 | 12/1963 | Aldridge | 8—115.5 |

OTHER REFERENCES

Somers: "Process With New Polymers-Isocyanates and Their Modifying Effects on Other Textile Polymers," British Rayon and Silk Journal, November 1953, pp. 62 and 63.

Marsh: "An Introduction to Textile Finishing," pp. 477–479.

Saunders et al.: "Polyurethanes: Chemistry and Technology," part I, p. 82; part II, pp. 735 to 745 and pp. 750 to 757.

WILLIAM D. MARTIN, Primary Examiner

H. J. GWINNELL, Assistant Examiner

U.S. Cl. X.R.

117—138.8, 139.5, 141, 144, 143, 154; 252—8.57, 8.8; 260—404.5